Dec. 29, 1925.
A. C. PIHL
1,567,294
ADJUSTABLE COUPLING
Filed Jan. 30, 1925
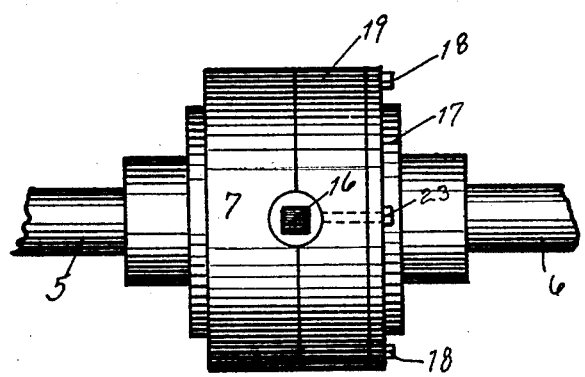
Fig. I.
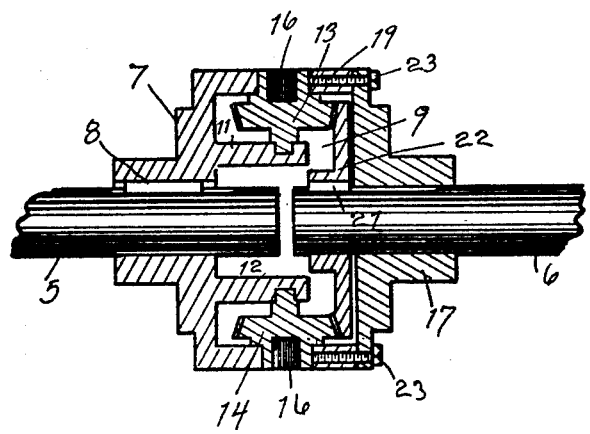
Fig. II.
INVENTOR.
ALFRED C. PIHL
BY *Victor J. Evans*
ATTORNEY.

Patented Dec. 29, 1925.

1,567,294

UNITED STATES PATENT OFFICE.

ALFRED C. PIHL, OF EUREKA, CALIFORNIA.

ADJUSTABLE COUPLING.

Application filed January 30, 1925. Serial No. 5,895.

*To all whom it may concern:*

Be it known that I, ALFRED C. PIHL, a citizen of the United States, residing at Eureka, in the county of Humboldt and State of California, have invented new and useful Improvements in Adjustable Couplings, of which the following is a specification.

This invention relates to improvements in adjustable couplings and has particular reference to the connecting of two shafts adapted to be secured to devices which must be timed with relation to each other.

The principal object of this invention is to provide means whereby two aligned shafts may be connected one to the other and yet capable of being adjusted by rotating one with respect to the other.

Another object is to produce a device of this character which is simple in construction, neat in appearance and one which is cheap to manufacture.

An additional object is to produce a device of this character which will utilize but a minimum amount of space.

Other objects and advantages will be apparent during the course of the following description.

In the accompanying drawings forming a part of this specification and in which like numerals are employed to designate like parts throughout the same, Figure 1 is a side elevation of my device secured to the ends of two shafts, and Figure 2 is a vertical crosssection of my device attached to the ends of two shafts.

In the connecting of the timing mechanism of an automobile to the engine, it is particularly necessary to secure the proper relation between the driven shaft and the shaft which is connected to the timing mechanism. A slight angular difference between these two shafts will result in inefficient operation of the engine. I have, therefore, devised a very simple mechanism which may be attached to the two shafts in such a manner that one of the shafts may be turned slightly, with relation to the other and then locked in its adjusted position.

In the accompanying drawings wherein for the purpose of illustration is shown a preferred embodiment of my invention, the numeral 5 designates a driving shaft and the numeral 6 a shaft to be driven.

It will be assumed that the shaft 5 is the cam shaft of the engine and the shaft 6 the shaft extending to the timing mechanism. To the cam shaft I key a casting 7 by means of a key 8, which casting is provided with a chamber 9 having arms 11 and 12 extending thereinto. These arms serve as bearings for gears 13 and 14, respectively.

The hubs of these gears are each provided with a socket as shown at 16, the purpose of which will be later seen. A casting 17 is positioned on the shaft 6 and is connected by screws 18 to a ring 19. This ring is, in turn, connected in a suitable manner to the casting 7.

Keyed to the end of the shaft 6 as by a key 21, is a gear 22 which gear is adapted to mesh with the gears 13 and 14. At 23 I have shown locking means consisting of bolts which pass through the casting 17 and ring 19 so as to contact the hubs of the gears 13 and 14.

The manner of operating my coupling is as follows:—

Assuming that the same has been connected to the respective shafts, the screws 23 loosened, a key is inserted in either of the sockets 16 and a partial rotation is given to the key. This motion is transmitted through the gear being employed as for instance the gear 13 to the gear 22 which being keyed to the shaft 6 causes the shaft to rotate with respect to the shaft 5 which is keyed through the casting 7 to the gear 13 being used.

As soon as the proper alignment has been secured, the screw 23 is locked against the hub of the gear which will prevent any further rotation of either shaft with respect to the other.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a casting adapted to be keyed to the end of a shaft, a second casting freely rotatable upon a second shaft in axial alignment with said first mentioned shaft, a gear keyed to said second mentioned shaft, a gear rotatably held in said first mentioned casting and adapted to mesh with said gear on said second mentioned shaft, and means for locking said second mentioned gear against rotation.

2. In a device of the character described, a casting keyed adjacent the end of a shaft, a second shaft in axial alignment with said first mentioned shaft, a casting freely rotatable on said second mentioned shaft, a pair of radially disposed gears positioned in said first mentioned casting, a gear positioned on said second mentioned shaft and adapted to mesh with said radially disposed gears, means for rotating said last mentioned gears, and means for locking said gears against rotation.

In testimony whereof I affix my signature.

ALFRED C. PIHL.